(12) United States Patent
Fossen

(10) Patent No.: US 10,860,220 B2
(45) Date of Patent: Dec. 8, 2020

(54) METHOD AND SYSTEM FOR TRANSFERRING DATA BETWEEN STORAGE SYSTEMS

(71) Applicant: Mover Inc., Edmonton (CA)

(72) Inventor: Mark Fossen, Edmonton (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/992,895

(22) Filed: May 30, 2018

(65) Prior Publication Data

US 2018/0293021 A1 Oct. 11, 2018

Related U.S. Application Data

(63) Continuation-in-part of application No. 14/990,772, filed on Jan. 7, 2016, now abandoned.

(60) Provisional application No. 62/100,558, filed on Jan. 7, 2015.

(51) Int. Cl.
*G06F 3/06* (2006.01)
*G06F 9/54* (2006.01)
*H04L 29/08* (2006.01)

(52) U.S. Cl.
CPC ............ *G06F 3/0617* (2013.01); *G06F 3/061* (2013.01); *G06F 3/0605* (2013.01); *G06F 3/065* (2013.01); *G06F 3/067* (2013.01); *G06F 3/0647* (2013.01); *G06F 3/0655* (2013.01); *G06F 3/0683* (2013.01); *G06F 9/546* (2013.01); *H04L 67/1097* (2013.01); *H04L 67/2842* (2013.01)

(58) Field of Classification Search
CPC ...... G06F 3/0617; G06F 3/067; G06F 3/0647; G06F 16/1844; G06F 16/185
See application file for complete search history.

(56) References Cited

U.S. PATENT DOCUMENTS

| 8,601,220 B1 * | 12/2013 | Corbin | G06F 3/0617 711/111 |
| 2012/0036330 A1 * | 2/2012 | Saito | G06F 3/0617 711/162 |
| 2013/0110779 A1 * | 5/2013 | Taylor | G06F 16/1844 707/624 |

OTHER PUBLICATIONS

U.S. Patent and Trademark Office, Non-final Office Action issued in U.S. Appl. No. 14/990,772 dated Nov. 30, 2017, 14 pages.

* cited by examiner

*Primary Examiner* — Kyung H Shin
(74) *Attorney, Agent, or Firm* — NovoTechIP International PLLC

(57) ABSTRACT

A system and method for transferring target data from a remote source to a remote destination are provided. Metadata such as directory structure and content is obtained from the source and used to organize the transfer. The transfer may be executed by operator elements which are customized to interact with particular remote sources and/or destinations. A configurable number of operator elements may run in parallel and a message queue may be used to distribute tasks to the operator elements in furtherance of the transfer. In some embodiments, the operator elements may be hosted by separate servers. Some of operator elements may be hosted by the same service that hosts the remote source or the remote destination.

23 Claims, 9 Drawing Sheets

410

Configuration Operations
- Selecting a data storage source and data storage destination;
- Selecting connector modules for use in transferring data from the data storage source and to the data storage destination;
- Extracting metadata indicative of the target data stored on the data storage source;
- Configuring execution of the data transfer based at least in part on the metadata and optionally on user input;
- Creating a worklist_comprising work items to be executed by one or more operator elements.

420

Execution Operations
- Spawning a desired number of operator elements; publishing the work items to a queue;
- Executing, by the operator elements, the work items published to the queue.

FIG. 4

METHOD AND SYSTEM FOR TRANSFERRING DATA BETWEEN STORAGE SYSTEMS

CROSS REFERENCE TO RELATED APPLICATION

This application is a continuation-in-part of U.S. application Ser. No. 14/990,772, filed Jan. 7, 2016, and which claims the benefit of U.S. Provisional Application No. 62/100,558, filed Jan. 7, 2015.

FIELD OF THE INVENTION

The present invention pertains in general to the field of data management and in particular to a method and system for transferring data between storage systems, such as cloud storage systems.

BACKGROUND

The storage and management of data is a significant area of concern for both personal and business enterprise users. Requirements such as reliability, security and accessibility are typical of such users. Cloud storage solutions are on offer which allow users to store data remotely and reliably. In addition, data may be stored on local servers or backup drives, which are also types of storage solutions.

From time to time a user may wish or be required to change storage solutions, copy or backup data from one storage solution to another, or the like. For example, existing remote storage service providers may go out of business or more attractive service providers may emerge. Historically, migration of data has required significant manual intervention. Furthermore, reliably, efficiently and/or securely moving large amounts of data between storage solutions poses significant technical challenges.

Therefore there is a need for a method and system for transferring data between storage systems that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of the present invention is to provide a method and system for transferring data between storage systems, including but not necessarily limited to cloud-based storage systems. In accordance with an aspect of the present invention, there is provided a system for interacting with a plurality of remote storage solutions, the system comprising: an interface configured to communicatively couple the system with the plurality of remote storage solutions via a data network connection, the plurality of remote storage solutions comprising a data storage source and a data storage destination; a temporary data storage medium configured to store data received from the data storage source; a core module configured to direct transfer of target data stored on the data storage source to the data storage destination via the temporary data storage medium; and one or more operator elements configured to interact with the data storage source and the data storage destination to implement transfer of the target data under direction of the core module, wherein one or more servers of the system are configured to provide the core module and the one or more operator elements as functional aspects thereof.

In accordance with another aspect of the present invention, there is provided a method for interacting with a plurality of remote storage solutions, the method comprising: interacting, via a data network connection, with the plurality of remote storage solutions, the plurality of remote storage solutions comprising a data storage source and a data storage destination; directing, using a core module, transfer of target data stored on the data storage source to the data storage destination via a temporary data storage medium configured to store data received from the data storage source; and implementing transfer of the target data under direction of the core module, using one or more operator elements configured to interact with the data storage source and the data storage destination, wherein the core module and the one or more operator elements correspond to functional aspects of one or more servers.

In accordance with another aspect of the present invention, there is provided a computer program product for interacting with a plurality of remote storage solutions, the computer program product comprising code which, when loaded into memory and executed on a processor of a computing device, is adapted to perform the method as set forth above or elsewhere herein.

BRIEF DESCRIPTION OF THE FIGURES

FIG. 4 illustrates configuration and execution operations provided in accordance with embodiments of the present invention.

DETAILED DESCRIPTION

Definitions

Figure 1A:
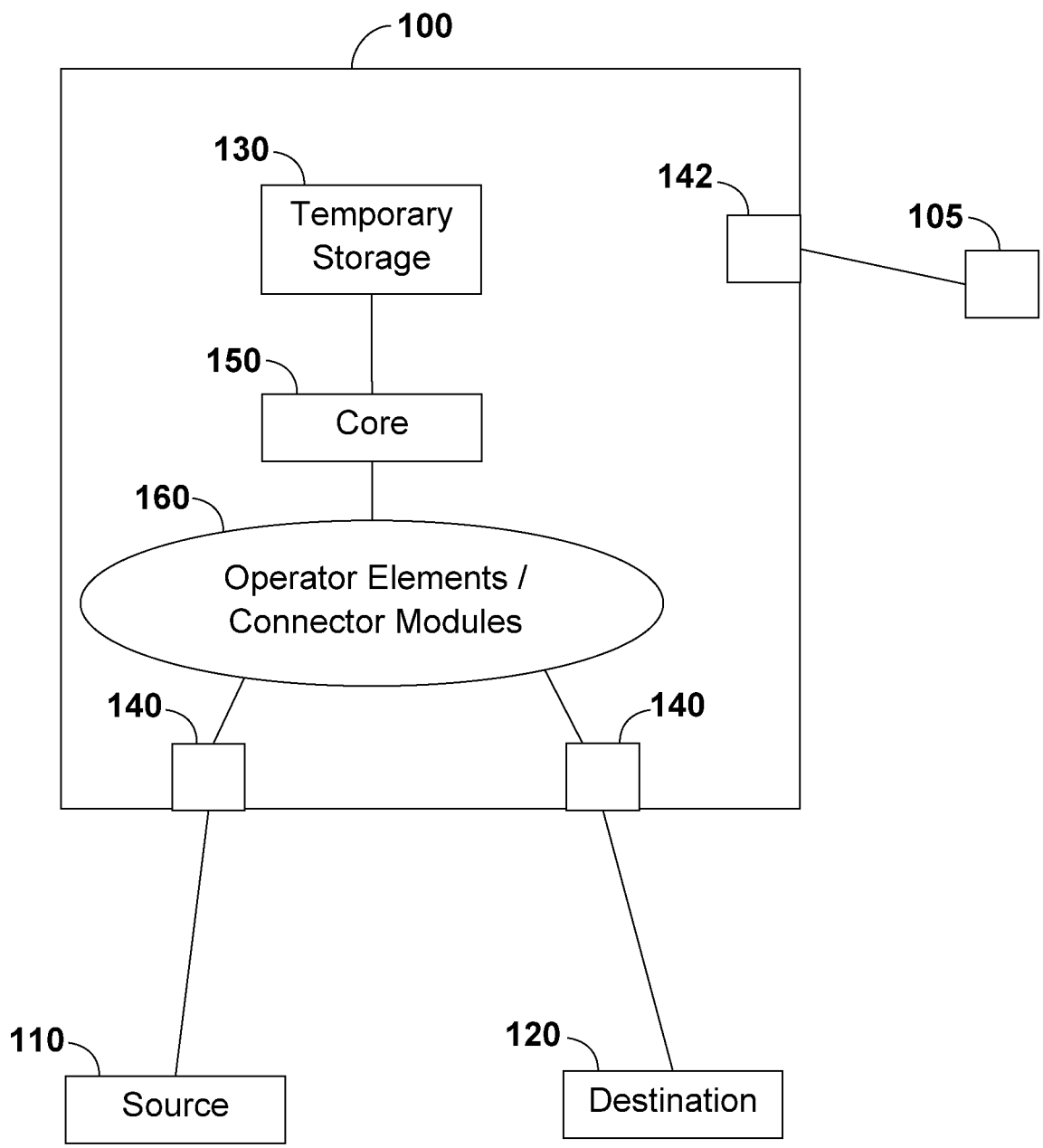
FIG. 1A illustrates a system for transferring target data from a data storage source to a data storage destination in accordance with an embodiment of the present invention.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

In accordance with an embodiment of the present invention, there is provided a system for interacting with a plurality of remote storage solutions, and more particularly for transferring target data form one remote storage solution to another. The system includes an interface configured to communicatively couple the system with the plurality of remote storage solutions via a data network connection. The plurality of remote storage solutions includes a data storage source and a data storage destination. The system further includes a temporary data storage medium configured to store data received from the data storage source. The system further includes a core module configured to direct transfer of target data stored on the data storage source to the data storage destination via the temporary data storage medium. The system further includes one or more operator elements configured to interact with the data storage source and the data storage destination to implement transfer of the target data under direction of the core module. In some embodiments the operator elements may correspond to connector modules as described elsewhere herein. One or more servers of the system are configured to provide the core module and the one or more operator elements as functional aspects thereof.

Various embodiments of the present invention relate to the transfer of data to or from a remote storage solution. Furthermore, various embodiments of the present invention relate to the transfer of data from one remote storage solution to another. A remote storage solution may be a hosted cloud storage solution for example as provided by a service provider such as but not limited to Amazon™ S3, Box™, Dropbox™, Filedropper™, iCloud™, and the like. A remote storage solution may alternatively be a server, a backup drive connected to a computer, or the like, which is remotely accessible via a protocol such as FTP, SFTP, or the like.

Various embodiments of the present invention comprise the steps of acquiring target data from a data storage source and transmitting the target data to a data storage destination. The data storage source and the data storage destination may correspond to different remote storage solutions. Acquisition of the target data may include copying the target data to one or more temporary data storage media which act as an intermediate waypoint for the target data prior to transmission to the data storage destination. That is, rather than transferring the target data directly from a data storage source to a data storage destination, the data is transferred via an intermediate or proxy waypoint. The use of an intermediate waypoint may facilitate data transfer particularly when the remote storage solutions offer limited interaction options.

FIG. 1A illustrates a system 100 for transferring target data from a data storage source 110 to a data storage destination 120, in accordance with embodiments of the present invention. The system 100 includes a temporary data storage medium 130 for storing a copy of the target data retrieved from the source. The temporary data storage medium may be a storage device such as a hard disk drive, solid-state memory, array thereof, or the like, or a combination thereof. The size of the temporary data storage medium may be configured based on system requirements such as transfer download and upload speed, latency, transfer file size, concurrent transfer volume, number of concurrent transfers, type and extent of error detection and/or error correction operations, and the like. For example, in some embodiments, the temporary data storage medium may be large enough to accommodate several target data sets in their entirety, so that download of the target data may be performed completely prior to upload of same. However, in some embodiments, target data may be uploaded as soon as possible after download, so that a copy of the target data stored on the temporary data storage medium may be deleted to make room for new target data. In some embodiments, deletion of data may optionally comprise removing pointers to data rather than complete erasure, particularly when the temporary data storage medium is periodically overwritten.

The system 100 further includes one or more typically a plurality of interfaces 140 which are configured to communicatively couple the system with the data storage source 110 and the data storage destination 120, and an interface 142 which is configured to communicatively couple the system with a remote user device 105. For example, the interfaces 140 may include various communication hardware, such as network interfaces, for operatively coupling the system 100 to the Internet and thereby to the data storage source 110 and the data storage destination 120. Similarly, the interface 142 may include various communication hardware, such as network interfaces, for operatively coupling the system 100 to the Internet and thereby to the remote user device 105. The interfaces 140 may additionally or alternatively comprise various physical components, computational components and/or means for communicating with a remote entity such as a storage service. In this regard, a given interface may include an Application Programming Interface (API) or a Command Line Interface (CLI). For example, an API may be provided for accessing a particular cloud storage service, while a CLI may be provided for accessing legacy services such as FTP, SFTP, MySQL, and local file systems. The interface 142 may include an API that is used to interact with the system and configure a particular data transfer. The interface 142 may be configured to interact with the core indirectly, for example by posting messages as database entries that may be read by other components such as the core. The interfaces 140 may be configured to transmit and receive information over a secure channel, for example using encryption protocols, authentication protocols, and the like.

The remote user device 105 may be a computer or mobile device operated by a user and communicatively coupled to the system 100. In some embodiments the remote user device may include an application which is configured to communicate with the system 100 in order to provide user input thereto. In some embodiments, the remote user device may include a web browser which, when pointed to a particular site hosted by a server of the system 100, enables the user to provider user input to the system 100. The user input may include details regarding a desired transfer of the target data, such as an identity of the data storage source 110 and the data storage destination 120, user credentials such as usernames and passwords or authorization tokens, specific target data to be involved in the transfer, security parameters, payment parameters, and the like.

The system 100 further includes a core module 150 which is configured, among other elements, to direct various operations related to the transfer of target data. The core module may be configured to: accept instructions from the remote user device 105; select and invoke particular operator elements or swarms of operator elements for coupling to a designated data storage source 110 and data storage destination 120; direct acquisition and storage of target data from the data source and storage thereof to the temporary data storage medium; and direct transfer of the target data from the temporary data storage medium to the data storage destination.

The system 100 further includes a set 160 of operator elements and/or connector modules which are configured to provide an intermediate interface between the core module 150 and the data storage source 110 and data storage destination 120. Once a particular type of data storage source and destination have been identified, the appropriate type and number of operator elements and/or connector modules may be invoked. Each type of connector module is customized for interacting with a particular type of data storage source or destination. For example, connector module types may be provided for different remote storage service providers such as Amazon™ S3, Box™, Dropbox™, Filedropper™, iCloud™, and the like. Each connector module may interact with the core module 150 via a common command set, but may be configured to interact with its particular data storage source or destination in a manner that may be customized for that data storage source or destination.

Figure 1B:
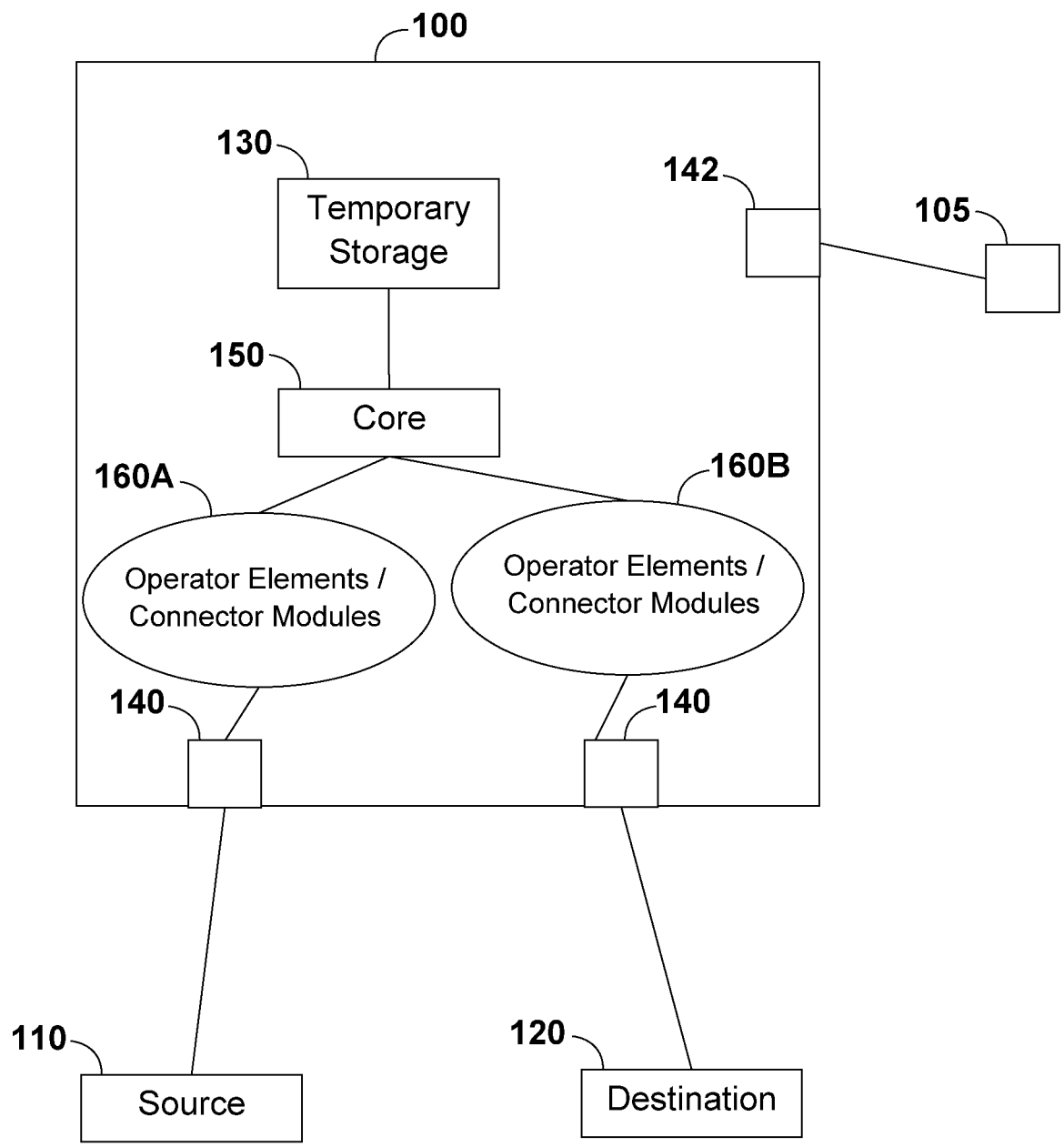
FIG. 1B illustrates a system for transferring target data from a data storage source to a data storage destination in accordance with another embodiment of the present invention.

FIG. 1B illustrates a system 100 which is the same as the system 100 illustrated in FIG. 1A, except that the set 160 of operator elements and/or connector modules is separated into a first set 160A of operator elements/connector modules and a second set 160B of operator elements/connector modules. The first set 160A of operator elements/connector modules is coupled between the data storage source 110 and the core module 150, while the second set 160B of operator elements/connector modules is coupled between the data storage destination 120 and the core module 150. Both sets of operator elements/connector modules can be selected from a common pool. However, FIG. 1B emphasizes that the operator elements/connector modules 160A coupled between the data storage source 110 and the core module 150 do not communicate directly with the operator elements/connector modules 160B coupled between the data storage destination 120 and the core module 150. Rather, the operator elements/connector modules 160A are operatively coupled via the core module to the operator elements/connector modules 160B. As such, data from the data storage source is handled by a first operator element/connector module, then handled by the core module, and then handled by a second operator element/connector module prior to transmission of this data (e.g. in translated form) to the data storage destination.

Accordingly, in various embodiments target data is transferred in two steps. In a first step, the target data is transferred from a data storage source to a temporary storage associated with a core module. In a second step, the target data is transferred from the temporary storage to the data storage destination. This facilitates modularization of the data transfer apparatus. In particular, rather than having to define a data transfer mechanism for each pair of data source and data destination types, an operator element/connector module is defined for each data source and data destination, and these operator elements/connector modules operate in pairs to effect the data transfer. Furthermore, an operator element/connector module can be bidirectional, in the sense that it can be used to transfer data either to or from a particular data repository (source or destination). Thus, for example, if there are N different types of data source and data destination, instead of having to define $N^2$-N different data transfer mechanisms, it is only required to define N different operator elements/connector modules. This approach simplifies the data transfer system and can thereby improve operation of the associated computing apparatus.

Embodiments of the present invention provide for a generalized and modular data transfer method and apparatus, in which the same core can interact with multiple different endpoints (data repositories). The apparatus is reconfigurable based on the endpoints currently being interacted with. Use of bidirectional operator elements/connector modules allows for a reduction in types of operator elements/connector modules, compared with use of unidirectional operator elements/connector modules.

According to embodiments of the present invention, modularization of the data transfer method and apparatus, including use of a separate core module, and selectably invoked and/or instantiated operator elements/connector modules, improves the operation of the data transfer apparatus. This is at least because unnecessary operator elements/connector modules are not required to be active in the computing device. Furthermore, the data transfer method and apparatus can be adapted to deal with new types of data repositories as they arise simply by defining and creating new operator elements/connector modules. The core module does not have to be adjusted or redefined to deal with new types of data repositories. Rather, the same core module simply communicates with operator elements/connector modules while being agnostic to the particular type of these operator elements/connector modules. Furthermore, multiple operator elements/connector modules can more readily be instantiated and operated concurrently due to the modularization.

Figure 2A:
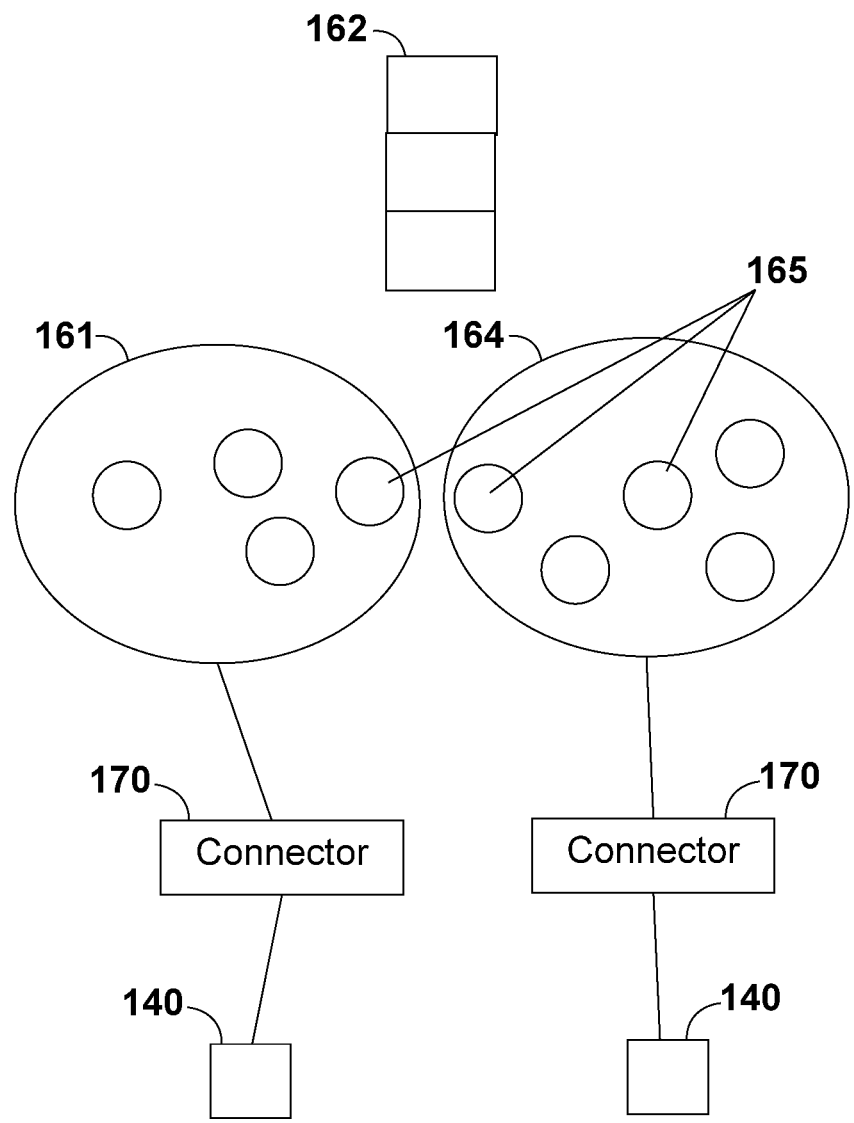
FIGS. 2A and 2B illustrate alternative configurations of operator elements and connector modules forming part of the system for transferring target data from a data storage source to a data storage destination in accordance with embodiments of the present invention.

FIG. 2A illustrates a first alternative configuration of operator elements and connector modules, corresponding to the set 160 of FIG. 1A and forming part of the system for transferring target data from a data storage source to a data storage destination in accordance with embodiments of the present invention. The configuration comprises a set of dedicated connector modules 170 which are operatively coupled to the interfaces 140. Communication with the data storage source 110 and the data storage destination 120 are routed through the appropriate connector modules 170. The configuration further comprises two sets 161, 164 each corresponding to a different plurality or "swarm" of operator elements 165 which retrieve instructions from a work list queue 162 and interact as necessary with the data storage source 110 and the data storage destination 120 via the connector modules 170. The two sets 161, 164 may be regarded as subsets of the set 160 of FIG. 1A. As illustrated, the two sets of operator elements are separate, such that each connector module is associated with a dedicated set of operator elements. The operator elements employed in each set may be generic or specific. Generic operator elements may be capable of operating with different types of connector modules, while specific operator elements may be capable of operating only with a particular type of connector module. Alternatively, when generic operator elements are employed, the two sets may overlap, or operator elements may migrate from one set to another, or a single common set of operator elements may be provided for association with connector modules on an as-needed basis.

Figure 2B:
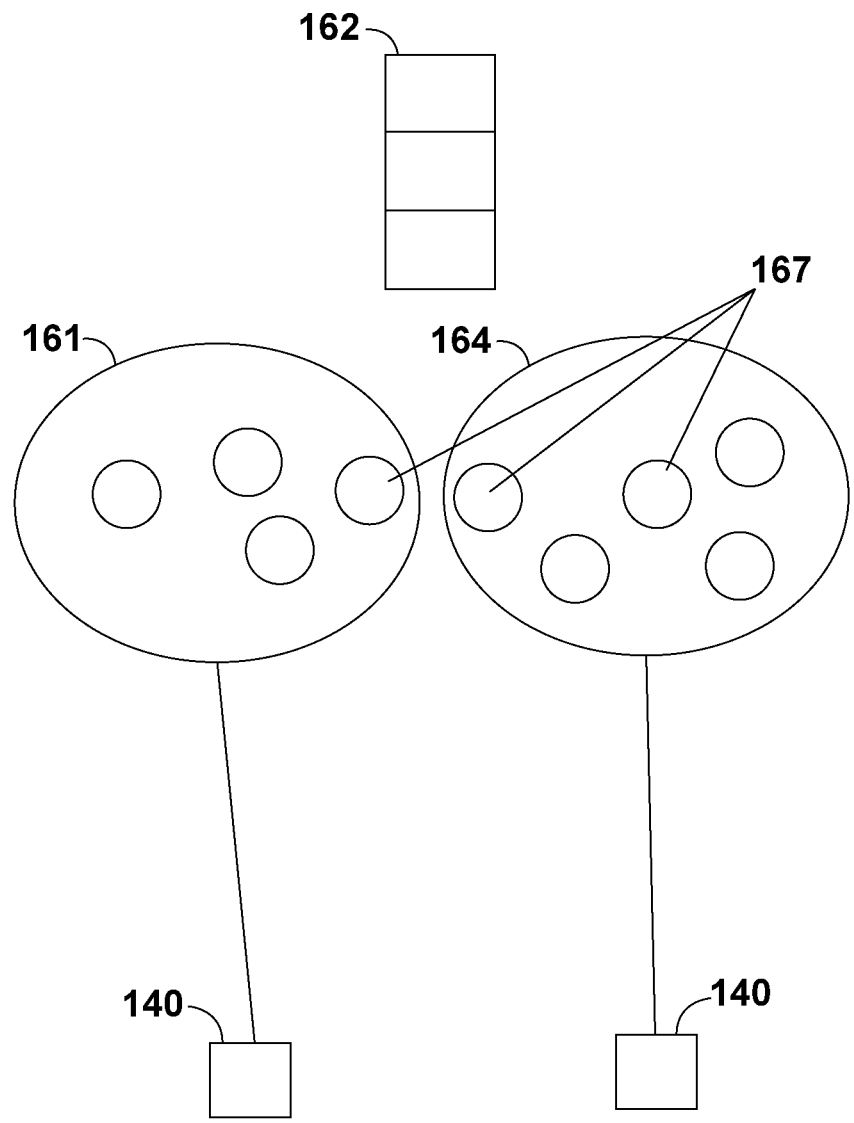

FIG. 2B illustrates a second alternative configuration of operator elements and connector modules, corresponding to the set 160 and forming part of the system for transferring target data from a data storage source to a data storage destination in accordance with embodiments of the present invention. The configuration comprises a plurality or "swarm" of operator elements 167 which retrieve instructions from a work list queue 162 and interact as necessary with the data storage source 110 and the data storage destination 120 directly via the interfaces 140, and without requirement of separate connector modules. Rather, the operator elements 167 themselves are configured as appropriate connector modules. As such, a plurality of different types of operator elements 167 may be invoked as required to interact with various types of data storage sources 110 and the data storage destinations 120.

In various embodiments, connector modules, or operator elements configured as connector modules, may be capable of interacting with a remote storage solution for facilitating both uploading and downloading of data. When such a connector module is coupled to a data storage source, the downloading capabilities may be employed, while when it is coupled to a data storage destination, the uploading capabilities may be employed. Alternatively, connector modules, or operator elements configured as connector modules, which have substantially only downloading or substantially only uploading capabilities may be selected for coupling with a data storage source or data storage destination, respectively.

In a particular embodiment, different swarms of operator elements may be dedicated for use with different connector modules, each of the connector modules and associated operator elements being capable of both downloading and uploading of data as required.

Figure 3:
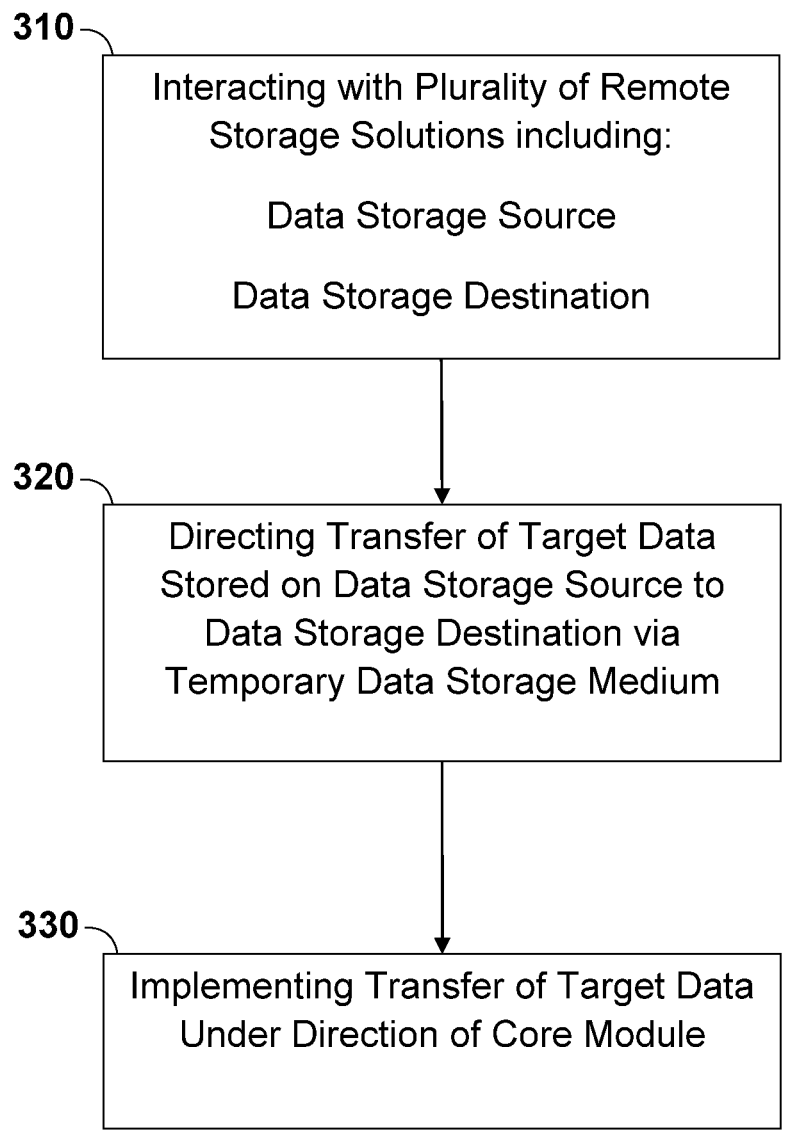
FIG. 3 illustrates a method for interacting with a plurality of remote storage solutions, in accordance with an embodiment of the present invention.

In accordance with another embodiment of the present invention, and with reference to FIG. 3, there is provided a method for interacting with a plurality of remote storage solutions. The method includes interacting 310 with the plurality of remote storage solutions. The interacting operation is performed via a data network connection. The plurality of remote storage solutions includes a data storage source and a data storage destination. The method further includes directing 320 transfer of target data stored on the data storage source to the data storage destination via a temporary data storage medium. The temporary data storage medium is configured to store data received from the data storage source. Directing the transfer is performed using a core module. The method further includes implementing 330 transfer of the target data under direction of the core module. The transfer is implemented using one or more operator elements configured to interact with the data storage source and the data storage destination. The core module and the one or more operator elements correspond to functional aspects of one or more servers.

In various embodiments, a swarm of operator elements may be invoked in order to parallelize aspects of the data transfer. In some embodiments, the operator elements may be connector modules themselves, for example connector modules of a given type. This approach may be used to eliminate the interface between operator elements and connector modules, by giving the operator elements the capabilities of the connector modules.

In other embodiments, the operator elements may be "worker" elements that are configured to interact with connector modules in order to interact with particular data storage sources or destinations. In this case, multiple operator elements may potentially interact with the same connector module in order to transfer data. In some embodiments, a group of similar connector modules may be operated in parallel, with multiple operator elements interacting with the different connector modules of the group. This approach may allow for simplification of the operator elements, for example by making them agnostic to details of the data storage source or destination which they are interacting with, and potentially reducing the number of types of operator elements.

The swarm may comprise a predetermined number of operator elements, the number determined for example by the core in order to provide a desired amount of parallelization. Increased parallelization within a certain range may result in increased transfer speed, although care may be required to avoid overwhelming a given data storage source, destination and/or service provider.

In various embodiments, the operator elements work together to implement a transfer of the target data. Downloading or uploading activities directed toward different files or other portions of the target data may be performed substantially independently from one another, in parallel, and in substantially arbitrary order under certain conditions. Thus, different operator elements may cooperate to download different portions of the target data. Uploading of different portions of the target data may depend on such portions having been previously downloaded to the temporary storage media, however given this condition and possibly certain other conditions, uploading activities may also be performed substantially independently of each other.

In various embodiments, the operator elements may be configured to share a state of a connector module with which the operator elements interact to download and/or upload target data. The connector module state may correspond to a quantum of work assigned thereto, which in turn may relate to a work item message received thereby and/or to a message to be produced. Sharing of the state of the connector module may be implemented via use of a message queue.

Referring again to FIG. 1A, the system 100 may comprise one or a plurality of computing devices such as servers, each comprising a microprocessor operatively coupled to memory and configured to execute program instructions stored in said memory. The temporary data storage medium 130 may further correspond to storage memory of such servers. The servers may be operatively coupled to each other via standard communication means, for example in association with a private network or virtual private network. The servers may be geographically co-located or distributed. Furthermore, in some embodiments, at least some of the servers may themselves be virtual servers.

In some embodiments, one or more of the servers may be hosted by the same service providers that host the data storage source and/or the data storage destination. Furthermore, when a particular service provider is identified as a source or a destination of the target data, servers hosted by that particular service provider may be selected and employed for transferring the target data. In this case, since some of the transfer operations are executed by a server on the particular service provider's internal network, transfer speed may be increased, costs may be decreased, or the like, or a combination thereof. In some embodiments, servers hosted by the same service providers that host the data storage source and/or the data storage destination may be used to implement operator elements rather than core modules. Further, in some embodiments, operator elements operating on a server hosted by such a service provider may be configured differently in order to take advantage of their location internal to the service provider.

In various embodiments, the servers may be capable of servicing a plurality of transfer requests of different users in parallel. Further, as noted above, operations corresponding to a particular transfer request may be parallelized. In order to perform various operations in parallel, the operations may be configured so that they are substantially separate and/or independent of each other. Further, the servers may be configured to provide an operating environment which allows for parallel execution of various operations. For example, the operating environment may comprise multiple servers, multiple microprocessors, multiple microprocessor cores, multithreading support, or the like, or a combination thereof.

Various embodiments of the present invention comprise a configuration operation and an execution operation. The configuration operation may be performed by a configuration module of the system while the execution operation may be performed by an execution module of the system. The configuration module, execution module, core module, operator elements and connector modules may correspond to different functional aspects of the system servers. For example, one or more microprocessors and other associated hardware elements of one or more servers may function at least in part to perform the operations of each of the modules.

FIG. 4 illustrates configuration and execution operations provided in accordance with some embodiments of the present invention. The configuration operations 410 may comprise one or more of: selecting a data storage source and data storage destination, for example based on user input; selecting connector modules for use in transferring data from the data storage source and to the data storage destination; extracting metadata indicative of the target data stored on the data storage source; configuring execution of the data transfer based at least in part on the metadata and optionally on user input; and creating a worklist comprising work items to be executed by one or more operator elements in order to implement transfer of the target data. The execution operations 420 may comprise one or more of: spawning a desired number of operator elements; publishing the work items to a queue; and executing, by the operator elements, the work items published to the queue. FIG. 4 illustrates a particular example scenario. However, it is noted that other configurations of swarms and connectors may be employed in alternative core-managed types of processes.

Configuration

The configuration operation generally corresponds to configuration of a data transfer to be executed. Configuration may be initiated for example based on a user request received from a remote user device, or based on a predetermined schedule for initiating data transfers, or the like. For example, a scheduling module may generate data transfer requests for forwarding to the configuration module in accordance with a predetermined schedule.

A data transfer request may comprise relevant parameters such as an account name, authorization credentials, identity of a data storage source and data storage destination, details of data to be transferred, and potentially other parameters such as service level parameters. In some embodiments, one or more aspects of the data transfer request may be retrieved in an interactive manner, for example by prompting a user for information or allowing a user to select particular data items to be transferred and/or to de-select particular data items which should not be transferred.

The configuration operation may comprise identifying the data storage source and the data storage destination and selecting and invoking appropriate connector modules for use in interacting with same. The configuration operation module may further comprise logging in to the data storage source, for example via a connector module, and using provided authentication credentials for example in order to access a designated account on a corresponding remote storage solution.

In various embodiments, the configuration operation further comprises extracting metadata indicative of the target data stored on the data storage source. The metadata may include structural and/or descriptive metadata. For example, the metadata may be indicative of the directory or file folder structure arrangement in which the target data is organized, the filenames and file locations corresponding to the various portions of the target data, the file sizes, and the like. The metadata may comprise a mapping of folder hierarchies associated with the target data. Other metadata may also be extracted, such as encryption or security information, file owner/author, file tags, file type, encoding or redundancy information, version number, modification, upload or backup dates, and the like.

In some embodiments, the extracted metadata may be normalized for example by converting the metadata into a standard format. When the metadata is extracted via a particular type of connector module which is configured for interacting with a particular data storage source, the connector module may be particularly configured for performing the conversion.

In various embodiments, the extracted metadata may be processed in order to configure execution of the data transfer. In some embodiments such processing includes a user interface step, in which various metadata is presented to a user for interactive configuration. For example, the user may be presented with a representation of the files held in the target data and may select which folders and/or files are to be included in the data transfer. User input may be received indicative of selection and/or prioritization of data transfer operations based on file or folder name or other metadata such as file size, file type, or the like.

In various embodiments, configuring execution of the data transfer comprises creating a worklist of operations to be performed in order to implement the data transfer. The operations may be organized into work items. For example, work items may include downloading a designated unit of data from the data storage source to the temporary data storage media, checking for and uploading a designated unit of data from the temporary data storage media to the data storage destination, checking integrity of a designated unit of data, renaming or transcoding a designated unit of data, or the like. A designated unit of data may correspond to a file folder, set of files, set of file folders, part of a file, part of a file folder, data block, data segment, or the like. The work items may be published to one or more queues for execution. In some embodiments, different work items may be treated differently, for example by publishing different work items to different queues or by specifying different parameters. For example, some work items may be prioritized for execution before or at a faster rate than others by using priority queues. As another example, different work items may be serviced to different levels, for example by imposing different security measures, error detection, file verification and/or correction operations, or the like.

In some embodiments, parsing the target data into designated units of data may be performed in a particular manner in order to optimize parameters such as data transfer speed, reliability, error avoidance, or the like. For example, data units may be selected in order to match a target data size, within a predetermined tolerance level. In some embodiments, different tolerances may be used based on metadata filters associated with different types of remote storage solutions and/or different service providers offering remote storage solutions. Tolerances may be related to file size, naming conventions, permissions, or the like, or a combination thereof. In some embodiments, a determination of actions to be taken may be made based on output of the metadata filters. For example, an action may be to ignore a file or rename a file.

In various embodiments, configuring execution of the data transfer comprises establishing parameters regarding a type and number of operator elements which are to be established in order to execute the work items held in the worklist. The operator elements may correspond to computer processes operating on one or more servers of the system, which are configured to retrieve items from the work list, execute those items, and in some embodiments return messages for example by posting a status or result to a message queue, or optionally by posting a new work item to the work list, by modifying an existing work item in the work list, or the like. Additionally or alternatively, messages such as success or failure messages may be written to a data transfer log. In some embodiments, the operator elements may correspond to the connector modules described elsewhere herein.

Figure 5:
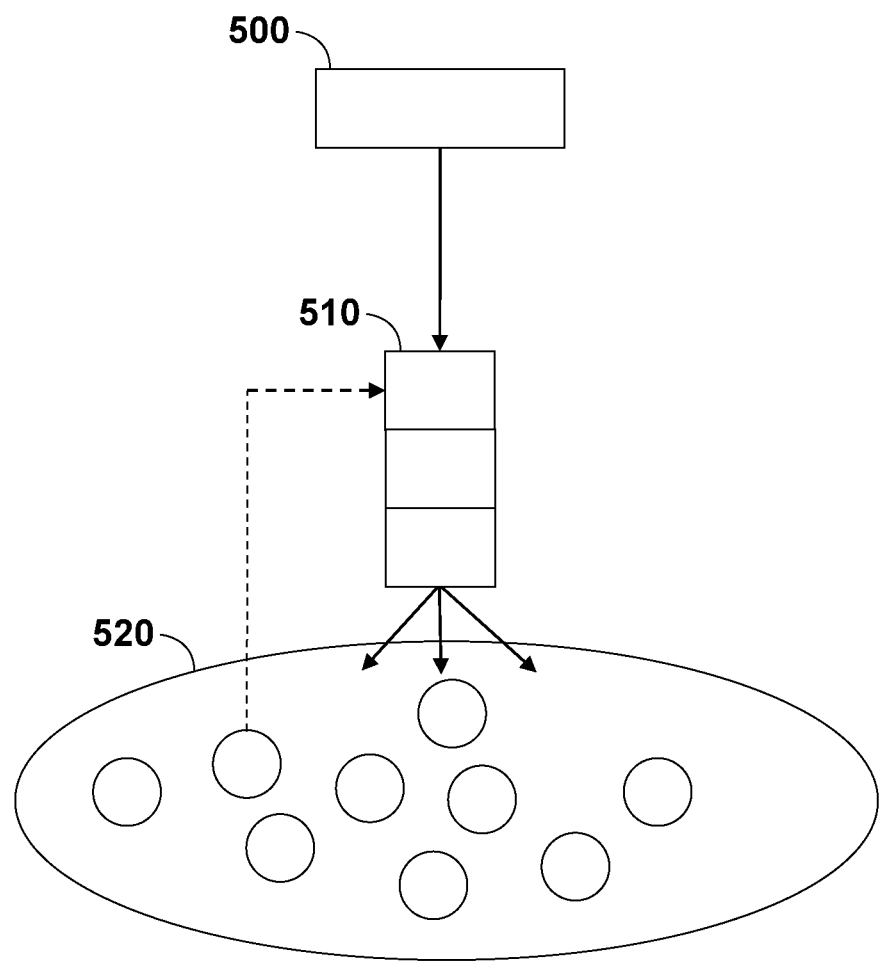
FIG. 5 illustrates a message queue of work items consumed by a swarm of operator elements, in accordance with an embodiment of the present invention.

FIG. 5 illustrates a message queue 510 of work items to be consumed by a swarm of operator elements 520, in accordance with an embodiment of the present invention. Operators elements from the swarm retrieve work items from the message queue 510 and may execute tasks indicated within said work items. Messages may be posted to the message queue by a supervisory process 500, for example. The supervisory process may correspond for example to an aspect of the core module of the system, as described elsewhere herein.

In some embodiments, one or more priority broadcast queues may be configured for broadcasting certain designated messages, for example as generated and designated by the supervisory process, to all operator elements. In some embodiments, messages sent via priority broadcast queues are handled ahead of other messages. Handling of priority messages may be pre-emptive or non-pre-emptive with respect to other messages currently being processed. Priority messages may correspond, for example, to messages instructing operator elements to back-off or reduce activity or bandwidth usage in order to avoid overwhelming a particular remote storage solution or service provider.

In various embodiments, establishing parameters regarding the operator elements may comprise specifying rules for the creation and/or invocation of operator elements for executing work items. The rules may include an initial number of operator elements, a maximum number of operator elements, rules for adjusting the number of operator elements, or the like.

In various embodiments, the configuration operation may comprise selecting servers which will be used to host various operator elements. For example, a virtual server may be selected and/or established (e.g. "spun up") which is hosted by the same service provider that hosts the data storage source and/or the data storage destination. As another example, a server may be selected due to its proximity, in terms of geography, number of network hops, or the like, to the data storage source and/or destination. As yet another example, software agents corresponding to operator elements may be transmitted to various local or remote servers for execution thereon. A server may further be selected based on its current or projected capacity. Rules may be established for hosting a predetermined number of operator elements on each selected server.

Figure 6:
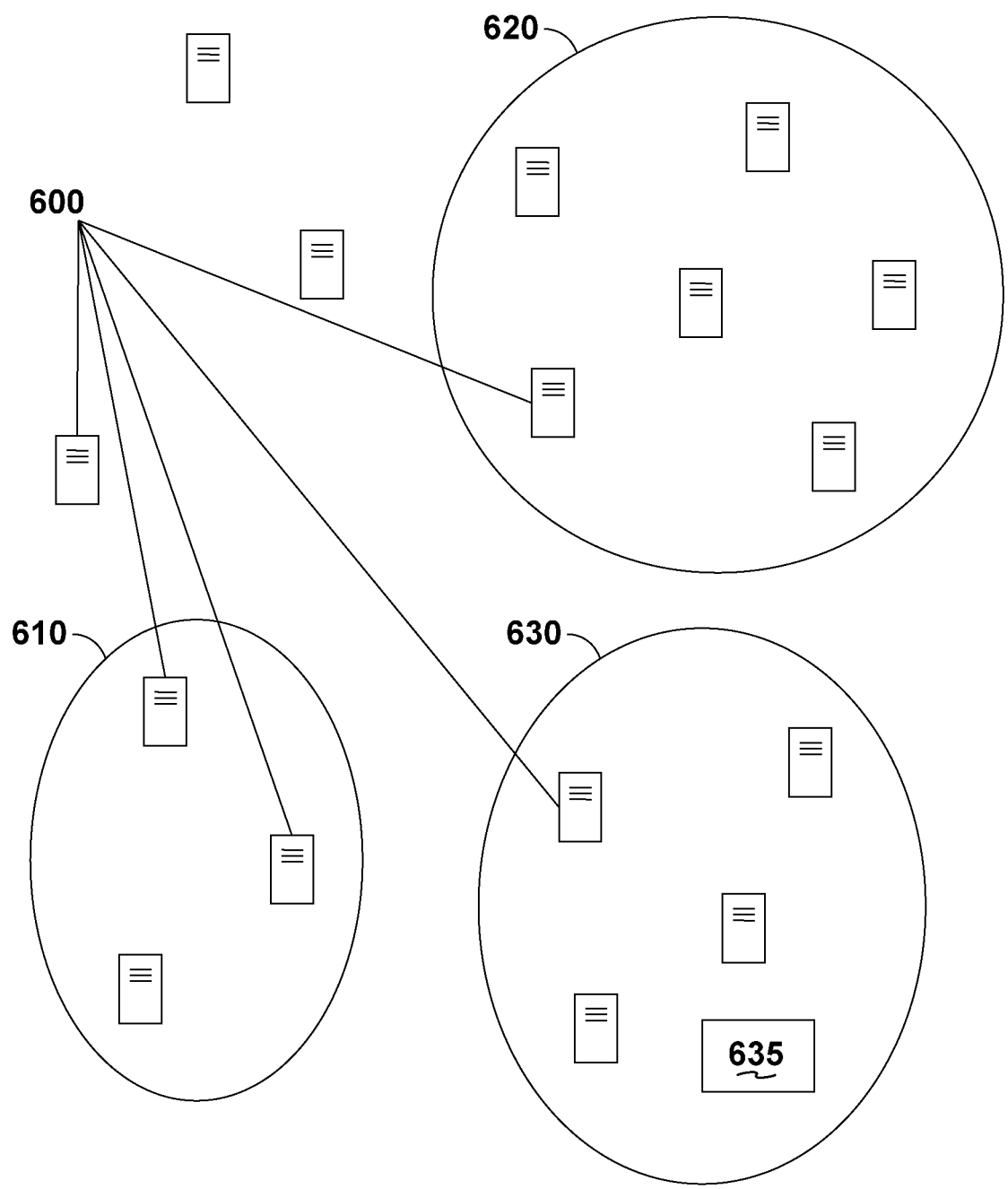
FIG. 6 illustrates a network of servers used in implementing data transfer in accordance with an embodiment of the present invention.

FIG. 6 illustrates a network of servers 600 used in implementing data transfer in accordance with an embodiment of the present invention. As illustrated, at least some of the servers 600 may reside in a plurality of different locations, such as locations 610 and 620. In some embodiments, servers may be invoked for use in a transfer process based at least in part on their location, which may be a geographic location or a location within a network such as the Internet. As also illustrated, at least some of the servers 600 may be hosted by a service provider 630 that also hosts the data storage source or destination 635.

Execution

The execution operation generally corresponds to execution of work items on the worklist. Execution may be performed by a single operator element or a number of operator elements operating concurrently and/or in parallel. A number of operator elements may be referred to as a "swarm." Operator elements may be configured to receive work items from the work list, execute the received work items, and post a result such as a success or failure, or in some embodiments a new work item.

In various embodiments, a given work item may require a sequence of message exchanges between the operator element and a target computing device representing the data storage source or the data storage destination. The operator element may be configured to participate in the sequence of message exchanges in order to execute the work item. Notably, the messages in the sequence may not be amenable to parallelization; however the work items may be amenable to parallelization. Work items may be defined at least in part on the basis that they may be executed in parallel and/or may be executed in different orders without substantially impacting the overall data transfer task.

In various embodiments, different operator elements may be configured to operate substantially independently from one another. As such, work items may be executed in parallel by different operators. In some embodiments, work items may be executable non-sequentially to a predetermined degree, while still achieving the same data transfer end result. That is, the data transfer may be tolerant to variation in the order in which at least a portion of the work items are executed.

Embodiments of the present invention utilize a message oriented protocol such as Advanced Message Queuing Protocol (AMQP) or an implementation thereof such as RabbitMQ™ for implementation of the worklist. For example, work items of the worklist may be published to a common message queue and plural operator elements may be configured to consume work items on the message queue. Messages in the various queues may follow a standardized format, and operator elements may be configured for interaction with messages in accordance with the standardized format. Other embodiments may utilize inter-process communication and programmatic queuing techniques. It is noted that various programming approaches may be used for implementation of the present invention where convenient, however embodiments of the present invention are not intended to be limited to a particular programming approach, protocol, or implementation thereof.

In some embodiments, operator elements may be configured to publish work items to a worklist. For example, once an operator element successfully downloads a data unit, it may publish a work item identifying the data unit and instructing that the data unit be uploaded. As another example, if an operator element fails to complete a work item, it may re-publish that work item to the worklist. In some embodiments, operator elements may post messages indicative of success or failure of a task to the worklist or a separate message queue. In some embodiments, operator elements do not publish work items to a worklist for execution by other operator elements. Rather, operator elements may publish messages for receipt by the core, and the core may then publish further work items as required.

Embodiments of the present invention may utilize a scripting language such as PHP™ for configuration of operator elements and/or connector modules. In various embodiments, operator elements may be configured to be substantially agnostic to their operating environment, for example by use of a substantially environment-independent scripting or programming language for definition of the operator elements. In one embodiment, operator elements may be configured as software agents which may be sent to a desired computing environment and executed thereon.

Embodiments of the present invention may utilize a scalable network application platform such as Node.JS™ for configuration of various operational modules thereof. Node.JS™ offers an asynchronous event driven framework which may be appropriate for specifying operator elements and/or for specifying an operating environment supporting a configurable number of operator elements. In some embodiments, Node.JS™ may be used as a director process configured to spawn the operator elements, for example written in PHP™. It is noted that different embodiments may be implemented using different platforms and/or programming languages.

In some embodiments, the execution operation may comprise spawning or otherwise adjusting a number of operator elements associated with a particular worklist. In some embodiments, operators may be dedicated to a particular worklist. In other embodiments, at least some operators may be configured to consume items from a plurality of worklists.

In various embodiments, execution of the transfer comprises managing operator elements, for example the number, type and/or activity thereof. For example, in response to an indication that the data storage source or the data storage destination is reaching or experiencing an overload condition, the operator elements may be commanded to backoff or reduce their data transfer activity in respect to same. Similarly, in response to an indication that a size limit of the temporary data storage media is to be exceeded, download activity thereto may be reduced or upload activity therefrom may be increased. Further, in some embodiments, the operator element activity may be reduced in order to avoid issuance of a throttling or backoff command by a representative of the data storage source or data storage destination. In some embodiments, reducing or increasing data transfer activity may comprise reducing or increasing the number of operator elements allocated to a particular worklist. In some embodiments, the number of operator elements involved in downloading the target data may be coordinated with the number of operator elements involved in uploading the target data. These numbers may be configured with respect to various limitations such as bandwidth limitations and size limitations of the temporary data storage media, in order to balance a plurality of constraints and/or objectives. In some embodiments, operator elements may themselves be configured to initiate changes to the allocation and/or number of operator elements, for example in order to trigger spawning of additional operator elements. In some embodiments, a management process may be configured to initiate such changes.

In some embodiments, the number and/or activity level of operator elements may be adjusted in order to respect service levels, authorized data transfer limitations or bandwidth limitations, or the like. For example, if a user has paid for or authorized transfer of a predetermined amount of data or a predetermined amount of data per unit time, then the operator elements may be adjusted so that the predetermined amount is not exceeded. A monitoring process may be configured to monitor amounts of data transferred and/or rates of data transfer and to halt or reduce data transfer if the amounts or rates are exceeded. In some embodiments, operator elements may be configured to check whether a data transfer is authorized prior to execution. Failed data transfer attempts may be re-attempted without counting toward authorization limits.

In some embodiments, the data storage destination may already comprise some of the target data, or a prior version thereof. This may be the case for example when data transfers are scheduled to occur periodically in order to mirror or backup data. In such embodiments, data transfer operations may comprise comparing contents of the data storage source and the data storage destination and transferring only target data that appears on the data storage source but not the data storage destination. In some embodiments, older versions of target data items may be deleted or overwritten. In some embodiments, data indicative of the difference between the data of the data storage source and the data of the data storage destination may be determined and transferred. In one embodiment, work items may be added to the worklist which direct operator elements to compare contents of the data storage source and the data storage destination and to avoid transferring data items which already appear in the data storage destination in an up-to-date version. Strategies comparable to differential backups and/or incremental backups may be employed to ensure that data of the data storage destination adequately matches data of the data storage source. In some embodiments, data transfer activities may be logged and dated so that subsequent comparisons between source and destination data may be expedited.

Additional Details

In various embodiments, in association with "swarm" operation comprising a plurality of concurrently working operator elements, divisible work is allocated in accordance with worklist messages defined in accordance with a predetermined sequence. Further, concurrent processing of work items on the worklist may be controlled through the queues in a particular manner.

In some embodiments, in relation to worklist message, sequencing management code, referred to as the "transfer," identifies a chain of queues. Each stage of the chain can be described with respect to input, or message from the queue, and the resulting messages that are produced. The sequencing may be configured so that it is flexible enough that another stage may be added to the sequence, for example in the middle of the sequence or at either end, and that a new stage is integrated into the ongoing process.

In some embodiments, messages enter stages through an appropriate queue, such as a worklist queue or other queue. Further, messages may be produced by a previous stage. Messages may be retrieved from a process and work performed based on same. The message may be viewed as being consumed in various embodiments. Once the message it properly dealt with, a response, or set of responses, may be created and sent to the transfer where more messages may be produced. The responses may adjust a state of the transfer in some embodiments.

Further, in some embodiments, each queue's consumer may be identified as a swarm. Swarms may be pieced together with their inputs and outputs to establish transfer logic. In some embodiments, the transfer process may be separated into three swarms: a swarm of operator elements such as connector modules or other operator elements, a swarm of account restrictions elements, and a swarm of logging elements. In some embodiments, a given transfer process may be implemented substantially by a single swarm. For example, each remote storage solution or associated service provider may be associated with a swarm which implements tasks related to data transfer to and/or from that storage solution or service provider. Each service-specific swarm may perform multiple tasks related to the data transfer, such as download, upload, authentication, error checking, and the like.

In various embodiments, a swarm may be configured to interpret a message command, or several types of message commands. Within the sequence of different data transfer objects, each queue and/or swarm may be used for different reasons.

In some embodiments, a swarm may be described by the type of message that is input and/or consumed, and by the types of messages that are output and/or produced.

In some embodiments, the transfer is configured to control initial message dispatch. In one such embodiment, the transfer may be configured to inform a swarm of connectors or other operator elements to simply upload a file. In another embodiment, multiple processing elements may be configured to read the message and pass results along in accordance with a chain of responsibility pattern.

In some embodiments, substantially all connector modules may be configured to have the same set of defined messages that they can process, with the same result types.

Embodiments of the present invention provide for an improvement in the operation of computerized data transfer systems due at least in part to modularization. Such data transfer systems by necessity are computerized in order to deal with computerized data storage sources and destinations.

According to embodiments of the present invention, operator elements/connector modules interact with a data storage source in order to translate information such as metadata from a representation native to the data storage source to a different representation which is native to the core module. The metadata is therefore prepared for handling by the core module, which is only required to be capable of handling the metadata in its own native representation. Similarly, operator elements/connector modules interact with a data storage destination in order to translate information such as metadata from a representation native to the core module to a different representation which is native to the data storage destination.

As will be readily understood from the above discussion, metadata can include file structure information filenames, timestamps, permissions such as user and sharing permissions, etc. Translating metadata can include representing the same metadata in a different format, while preserving as much of the metadata as possible.

For example, file structure metadata can be represented at a first data repository (e.g. data storage source) using a first format which is different from a second format used by the core module. The file structure metadata can be represented at a second data repository (e.g. data storage destination) using a third format which is also different from the second format. The file structure metadata can indicate a potentially nested set of directories and the locations of files within this set of directories. The file structure metadata can be translated by an operator element/connector module from the first format to the second format, and later translated by another operator element/connector module from the second format to the third format. The file structure metadata can be used to configure the ordering of file transfer operations, as well as for defining the structure of data at the data storage destination.

As another example, permission metadata, indicative of which users are permitted to access a given file, can be represented in different formats at different data repositories and also at the core module. The permission metadata can be translated between formats the appropriate operator elements/connector modules, similarly to the file structure metadata. The permission metadata can be used to configure permissions at the data storage destination. Furthermore, in some embodiments, the permission metadata may be used to configure access to the data at the data storage source for file transfer purposes.

If a perfect translation between metadata formats is not available, for example in the case that metadata in a first format does not have an analogous representation in a second format, rules can be invoked by the operator element/connector module which generate a representation in the second format which approximates the metadata in the first format. For example, if the first format allows for loops within permission metadata and the second format does not, then the translation can remove the loops in the permission metadata.

According to embodiments of the present invention, operator elements/connector modules are substantially stateless between assigned tasks, in the sense that they are configured to receive and execute one instructed task (e.g. from the core module or a higher-level operator element/connector module) at a time. After completion of an instruction, an operator element/connector module returns to a condition ready to receive the next instructed task. In this condition, the operator element/connector module retains no state or memory elements left over from its execution of prior tasks. This causes all operator elements/connector modules of a given type to be functionally identical as long as they are idle (ready to receive a new instructed task). As such, the core module does not have to track individual states of a potentially large number of operator elements/connector modules. Rather, the core module can select an operator element/connector module arbitrarily from a given pool and provide a next task thereto. This further reduces complexity of the computer system and potentially improves its operation. This stateless nature of operator elements/connector modules can thus simplify and improve parallelization. Furthermore, this simplifies the conditions under which operator elements/connector modules can be instantiated or deleted, because all operator elements/connector modules of a given type function identically to one another.

In some embodiments, operator elements/connector modules are deleted under certain conditions, such as greater than a threshold amount of idle time, or requirement for resources. The conditions for deleting operator elements/connector modules can be defined based on a trade-off between a reduction in resource usage gained from deleting idle operator elements/connector modules of a given type, and an increase in resource usage required to delete and then later re-instantiate these operator elements/connector modules. Thus, operator elements/connector modules can exist in an idle state for a substantial period of time.

According to embodiments of the present invention, operator elements/connector modules are instantiated within a computer system on an as-needed basis. Instantiation of an operator element/connector module can include allocating working memory space for the operator element/connector module (e.g. in RAM), and initiating a process (e.g. involving one or more threads) with a computer processor in order to execute program instructions for carrying out the operations of the operator element/connector module. Instantiation of an operator element/connector module may further include associating the operator element/connector module with a logical port of a network interface. Operator elements/connector modules which are no longer needed can be made dormant or removed. Thus, the resources of the computer system are managed by only running the necessary operator elements/connector modules at a given time.

Operator elements/connector modules can be instantiated as required based on master program instructions stored in non-volatile memory. Multiple copies or clones of the same operator element/connector module can be instantiated based on the same master program instructions and operated concurrently. As such, the program instructions for instantiating operator element/connector module are efficiently stored in the computer system.

Each operator element/connector module may be customized to interact with a particular remote storage solution or subset of remote storage solutions. This can involve customizing protocols, permissions, command and query language, etc. of each connector module. In various embodiments, each operator element/connector module may be configured with the necessary permissions to interact with a particular remote storage solution or subset of remote storage solutions.

In various embodiments, metadata received from a remote storage solution can be converted into a different form of metadata. For example, the metadata can be converted into a generalized (e.g. universal) format native to the core module. The converted metadata, e.g. in the generalized format, can be used to direct the data transfer to the destination remote storage solution. For example, metadata indicative of directory structures can be converted into a format that is usable by the destination remote storage solution to specify directory structure. The core module, potentially along with the operator elements/connector modules themselves can be configured to process the metadata once converted to the generalized format, in order to direct the operations of the core module and the operator elements/connector modules. Therefore, the core module and the operator elements/connector modules are only required to be capable of processing metadata in the generalized format, but can receive and transmit metadata in a different format.

The modularized system of connectors, in which different connector modules are selected and used according to the identities of remote storage solutions being interacted with, allows for an efficient and manageable data transfer system that is capable of interacting with a variety of different pairs of remote storage solutions. This approach streamlines the data transfer operation because only the necessary connector modules are invoked at a given time.

Figure 7:
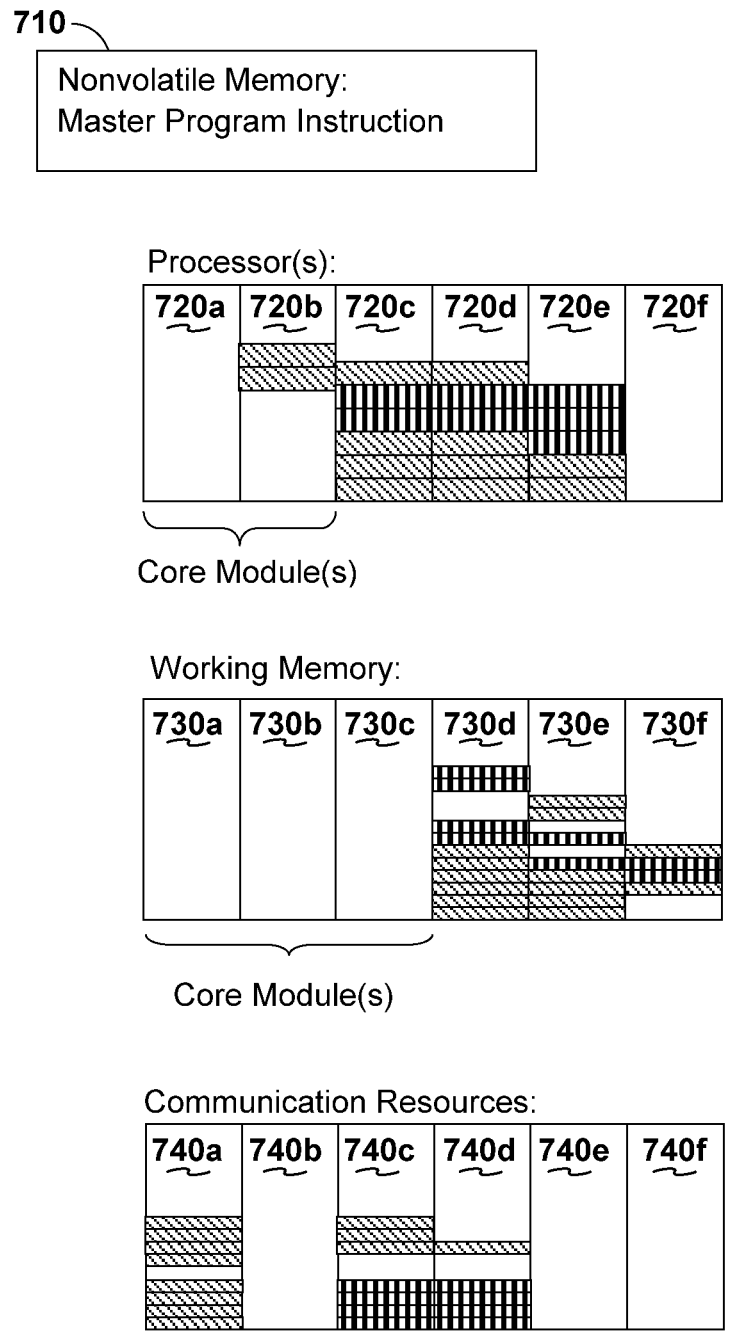
FIG. 7 illustrates a computer system provided in accordance with an embodiment of the present invention.

FIG. 7 illustrates a computer system provided in accordance with an embodiment of the present invention. It is possible but not necessary for all elements of the computer system to be co-located, for example in the same datacenter. In some cases, some or all elements of the computer system may be provided via one or more virtualization layers. The computer system includes a nonvolatile memory 710 comprises master program instructions which can be used as the template for instantiating each of a plurality of operator elements/connector modules. The computer system further includes one or a plurality of computer processor resources, subdivided into multiple blocks, denoted 710*a*, 710*b*, 710*c*, 710*d*, 710*e*, 710*f*. Each block of computer processor resource may be a separate computer processor, multicore computer processor, or collection of computer processors. Similarly, the computer system includes working memory resources, such as RAM, subdivided into multiple blocks, denoted 720*a*, 720*b*, 720*c*, 720*d*, 720*e*, 720*f*. Each block of memory resources may include a predetermined number of RAM circuits of a given size. Similarly, the computer system includes communication resources, such as network modems, subdivided into multiple blocks, denoted 730*a*, 730*b*, 730*c*, 730*d*, 730*e*, 730*f*. More or fewer blocks of each resource can be provided. Each block of communication resources may include a number of logical ports or network addresses operated by one or more modems.

The resources, including the computer processor resources, working memory resources, and communication resources, can be used together to instantiate the core module and the operator elements/connector modules. Thus, these modules are provided via appropriately configured and operating computer components. By way of example, all of processor resource block 720*a* and most of processor resource block 720*b* are dedicated to support one or more core modules. The remainder of the processor resource blocks are shared by a plurality of operator elements/connector modules. Each rectangular block with diagonal hatching represents the processing resources used by a different operator element/connector module of a first type. Each rectangular block with vertical hatching represents the processing resources used by a different operator element/connector module of a second type. Further types of operator elements/connector modules may similarly be supported.

Similarly by way of example, memory resource blocks 720*a*, 720*b* and 720*c* are dedicated to support one or more core modules. The remainder of the memory resource blocks are shared by a plurality of operator elements/connector modules. Again, each rectangular block with diagonal hatching represents the memory resources used by a different operator element/connector module of a first type, and each rectangular block with vertical hatching represents the memory resources used by a different operator element/connector module of a second type. Further types of operator elements/connector modules may similarly be supported.

Similarly by way of example, the communication resource blocks are shared by the plurality of operator elements/connector modules. Again, each rectangular block with diagonal hatching represents the communication resources used by a different operator element/connector module of a first type, and each rectangular block with vertical hatching represents the communication resources used by a different operator element/connector module of a second type. Further types of operator elements/connector modules may similarly be supported.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure some or all of its components in accordance with the system of the invention.

Acts associated with the method described herein can be implemented as coded instructions in a computer program product. In other words, the computer program product is a computer-readable medium upon which software code is recorded to execute the method when the computer program product is loaded into memory and executed on the microprocessor of a computing device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, PHP, or the like. In addition, each step, or a file or object or the like implementing each said step, may be executed by special purpose hardware or a circuit module designed for that purpose.

As described herein, the core module and the one or more operator elements correspond to functional aspects of one or more servers. For example, each of the servers includes at least one microprocessor operatively coupled to memory, the memory containing program instructions for execution by the microprocessor. The memory may further be configured to store input data for provision to the microprocessor and/or output data provided by the microprocessor. The microprocessor is further operatively coupled to a network interface of the server and directs the network interface to transmit data to and receive data from other servers and/or client devices. As such, the one or more servers include microprocessors each operatively coupled to a memory and a network interface and configured to function as the core module(s) and the one or more operator elements. Similarly, methods provided according to embodiments of the present invention may be performed by the microprocessors, memory components, and network interfaces of the servers.

Embodiments of the present invention relate to data storage and data transfer, and hence are directed toward configuring a portion of computer memory located at a data storage destination such that it replicates the configuration of a corresponding portion of a computer memory located at a data storage source. These computer memories can be considered as specific physical objects with which the present invention interacts by way of a communication interface.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. A system for interacting with a plurality of remote storage solutions to transfer data therebetween, each of the plurality of remote storage solutions comprising a respective computerized data storage accessible via data network, the system comprising:
    a data network interface configured to communicatively couple the system with a dynamically selected two of the plurality of remote storage solutions via a data network connection, each remote storage solution operated by a different remote storage service provider and the selected two remote storage solutions comprising a data storage source and a data storage destination;
    a temporary data storage medium configured to store data received from the data storage source;
    a message queue;
    a computerized core module configured to direct transfer of target data stored on the data storage source to the data storage destination via the temporary data storage medium, the core module further configured to post messages to the message queue;
    a plurality of computerized operator elements configured to interact with the data storage source and the data storage destination to implement transfer of the target data under direction of the core module, wherein the operator elements work in parallel and are configured to obtain the messages from the message queue, the messages directing the operator elements to perform work items for implementing the transfer of the target data; and
    a plurality of computerized connector modules separate from the plurality of remote storage solutions, each connector module configured to interact with a corresponding one of the remote storage solutions, wherein the core module is configured to select and invoke at least one of the connector modules for interacting with the data storage source, the data destination, or both, the interaction facilitating the transfer of the target data, the selecting being based on an identity of the data storage source or the data storage destination,
    wherein the plurality of operator elements is further configured to post a message to the message queue.

2. The system according to claim 1, wherein the core module is configured to activate the operator elements and the connector modules according to identities of the data storage source and the data storage destination.

3. The system according to claim 1, wherein the selected and invoked modules also act as the operator elements.

4. The system according to claim 1, wherein the core module, or a combination of the core module and the operator elements, is further configured to:
    obtain metadata from the data storage source, the metadata indicative of content or structure of the target data as stored on the data storage source; and
    create a worklist based on the metadata, the worklist comprising a plurality of work items which, when executed by the operator elements, implement the transfer of the target data.

5. The system according to claim 1, wherein:
    wherein one or more servers of the system are configured to provide the core module and the operator elements as functional aspects thereof, and
    the core module is further configured to select at least one of the one or more servers based on an identity of the data storage source or an identity of the data storage destination, the selected at least one of the one or more servers being separate from the data storage source and the data source destination.

6. The system according to claim 5, wherein the core module is configured to select the at least one of the one or more servers as a server hosted by the remote storage service provider that also hosts the data storage source or the data storage destination.

7. The system according to claim 1, wherein at least one of the operator elements is executed on a computer hosted by a service provider that also hosts the data storage source or the data storage destination, the computer being separate from the data storage source and the data source destination.

8. The system of claim 1, wherein the temporary data storage medium is separate from the selected remote storage solutions.

9. A method for interacting with a plurality of remote storage solutions, each remote storage solution comprising a respective computerized data storage accessible via data network, the method comprising:

interacting, via a data network connection, with a dynamically selected two of the plurality of remote storage solutions, each remote storage solution hosted by a different remote storage service provider and the selected two remote storage solutions comprising a data storage source and a data storage destination;

directing, using a computerized core module comprising a computer processor executing computer program instructions stored in memory, transfer of target data stored on the data storage source to the data storage destination via a temporary data storage medium configured to store data received from the data storage source, the core module further configured to post messages to a message queue;

implementing transfer of the target data under direction of the core module, using a plurality of computerized operator elements configured to interact with the data storage source and the data storage destination, wherein the operator elements work in parallel and are configured to obtain the messages from the message queue, the messages directing the operator elements to perform work items for implementing the transfer of the target data, the plurality of operator elements further configured to post a message to the message queue; and selecting and invoking at least one of a plurality of computerized connector modules separate from the plurality of remote storage solutions, each connector module configured to interact with a corresponding one of the remote storage solutions, wherein the selecting comprises selecting at least one of the connector modules for interacting with the data storage source, the data destination or both, the interacting comprising facilitating the transfer of the target data, the selecting being based on an identity of the data storage source or the data storage destination.

10. The method according to claim 9, further comprising operating the core module to activate the operator elements and the connector modules according to identities of the data storage source and the data storage destination.

11. The method according to claim 9, wherein the selected and invoked connector modules also act as the operator elements.

12. The method according to claim 9, further comprising:
obtaining metadata from the data storage source, the metadata indicative of content and/or structure of the target data as stored on the data storage source; and
creating a worklist based on the metadata, the worklist comprising a plurality of work items which, when executed by the operator elements, implement the transfer of the target data.

13. The method according to claim 9, wherein:
the core module and the operator elements correspond to functional aspects of one or more servers, and
the method further comprises selecting at least one of the one or more servers based on an identity of the data storage source or an identity of the data storage destination.

14. The method according to claim 13, further comprising selecting the at least one of the one or more servers as a server hosted by the remote storage service provider that also hosts the data storage source or the data storage destination, the selected at least one of the one or more servers being separate from the data storage source and the data source destination.

15. The method according to claim 9, further comprising executing at least one of the operator elements on a computer hosted by a service provider that also hosts the data storage source or the data storage destination, the computer being separate from the data storage source and the data source destination.

16. The method of claim 9, wherein the temporary data storage medium is separate from the selected remote storage solutions.

17. A non-transitory computer readable medium containing instructions which, when executed by a processor, cause a computer to perform functions of:
interacting, via a data network connection, with a dynamically selected two of a plurality of remote storage solutions, each remote storage solution hosted by a different remote storage service provider and the selected two remote storage solutions comprising a data storage source and a data storage destination;

directing, using a computerized core module, transfer of target data stored on the data storage source to the data storage destination via a temporary data storage medium configured to store data received from the data storage source, the core module further configured to post messages to a message queue;

implementing transfer of the target data under direction of the core module, using a plurality of computerized operator elements configured to interact with the data storage source and the data storage destination, wherein the operator elements work in parallel and are configured to obtain the messages from the message queue, the messages directing the operator elements to perform work items for implementing the transfer of the target data, the plurality of operator elements further configured to post a message to the message queue; and selecting and invoking at least one of a plurality of computerized connector modules separate from the plurality of remote storage solutions, each connector module configured to interact with a corresponding one of the remote storage solutions, wherein the selecting comprises selecting at least one of the connector modules for interacting with the data storage source, the data destination or both, the interacting comprising facilitating the transfer of the target data, the selecting being based on an identity of the data storage source or the data storage destination.

18. The non-transitory computer readable medium of claim 17, wherein the instructions, when executed by the processor, further cause the processor to control the computer to perform a function of operating the core module to activate the operator elements and the connector modules according to identities of the data storage source and the data storage destination.

19. The non-transitory computer readable medium of claim 17, wherein the selected and invoked connector modules also act as the operator elements.

20. The non-transitory computer readable medium of claim 17, wherein the instructions, when executed by the processor, further cause the processor to control the computer to perform functions of:
obtaining metadata from the data storage source, the metadata indicative of content and/or structure of the target data as stored on the data storage source; and
creating a worklist on the metadata, the worklist comprising a plurality of work items which, when executed by the operator elements, implement the transfer of the target data.

21. The non-transitory computer readable medium of claim 17, wherein:
the core module and the operator elements correspond to functional aspects of one or more servers, and the instructions, when executed by the processor, further cause the processor to control the computer to perform a function of selecting at least one of the one or more servers based on an identity of the data storage source or an identity of the data storage destination.

22. The non-transitory computer readable medium of claim 21, wherein the instructions, when executed by the processor, further cause the processor to control the computer to perform a function of selecting the at least one of the one or more servers as a server hosted by the remote storage service provider that also hosts the data storage source or the data storage destination, the selected at least one of the one or more servers being separate from the data storage source and the data source destination.

23. The non-transitory computer readable medium of claim 17, wherein the instructions, when executed by the processor, further cause the processor to control the computer to perform a function of executing at least one of the operator elements on a computer hosted by a service provider that also hosts the data storage source or the data storage destination, the computer being separate from the data storage source and the data source destination.

\* \* \* \* \*